(12) United States Patent
Leffert et al.

(10) Patent No.: US 11,646,471 B2
(45) Date of Patent: May 9, 2023

(54) RECHARGEABLE ENERGY STORAGE SYSTEM HIGH FLOW THERMAL VENT MANAGEMENT SYSTEM

(71) Applicant: GM GLOBAL TECHNOLOGY OPERATIONS LLC, Detroit, MI (US)

(72) Inventors: Michael G. Leffert, Howell, MI (US); Bradley S. Thomson, Farmington Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 245 days.

(21) Appl. No.: 17/038,609

(22) Filed: Sep. 30, 2020

(65) Prior Publication Data

US 2022/0102692 A1    Mar. 31, 2022

(51) Int. Cl.
| | | |
|---|---|---|
| *H01M 10/48* | (2006.01) |
| *H01M 10/6563* | (2014.01) |
| *H01M 10/625* | (2014.01) |
| *H01M 10/6556* | (2014.01) |
| *H01M 50/30* | (2021.01) |
| *H01M 50/20* | (2021.01) |

(52) U.S. Cl.
CPC ......... *H01M 50/30* (2021.01); *H01M 10/486* (2013.01); *H01M 10/625* (2015.04); *H01M 10/6556* (2015.04); *H01M 10/6563* (2015.04); *H01M 50/20* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2014/0224562 A1* | 8/2014 | Ozawa | ...................... | B60K 1/04 |
| | | | | 180/291 |
| 2019/0165393 A1* | 5/2019 | Kaneko | ............. | H01M 8/04425 |
| 2019/0393537 A1* | 12/2019 | Toda | ................. | H01M 8/04373 |

FOREIGN PATENT DOCUMENTS

| | | | | | |
|---|---|---|---|---|---|
| CN | 204809290 U | * | 11/2015 | ............... | H01M 2/12 |
| JP | 2006-182264 | * | 7/2006 | ............. | B60K 13/04 |
| JP | 2009-289655 | * | 12/2009 | ............... | H01M 2/12 |
| WO | WO 2021/174951 | * | 9/2021 | ............. | B01D 53/86 |
| WO | WO 2022/041062 | * | 3/2022 | .......... | H01M 50/342 |

* cited by examiner

*Primary Examiner* — Amanda J Barrow

(57) ABSTRACT

A rechargeable energy storage system, includes a housing. A plurality of battery cells are disposed in the housing. A discharge vent passage is in communication with the housing, the discharge vent passage including a one-way valve and a nozzle. A chamber is in communication with the nozzle and including an air inlet passage with a one-way valve. An outlet pipe is connected to the chamber. According to an aspect, the air inlet passage of the thermal vent management system is arranged as a Venturi opening adjacent to the nozzle.

10 Claims, 5 Drawing Sheets

RECHARGEABLE ENERGY STORAGE SYSTEM HIGH FLOW THERMAL VENT MANAGEMENT SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a high flow thermal vent management system for a rechargeable energy storage system.

In rare circumstances a rechargeable energy storage system for a vehicle may develop an internal fault causing its cells to expel a gas. This may occur in one or more cells and may proceed to cause multiple cells to vent. Several methods of allowing these gasses to exit the rechargeable energy storage system have been developed in the electric vehicle industry. At this time, the state of the art is to simply vent the gasses from the rechargeable energy storage system and under the vehicle. However, there is a need for a system that isolates the discharged gasses.

SUMMARY

This section provides a general summary of the disclosure, and is not a comprehensive disclosure of its full scope or all of its features.

According to the principles of the present disclosure, a rechargeable energy storage system, includes a housing. A plurality of battery cells are disposed in the housing. A discharge vent passage in communication with the housing, the discharge vent passage including a one-way valve and a nozzle. A chamber in communication with the nozzle and including an air inlet passage with a one-way valve. An outlet pipe connected to the chamber.

According to a further aspect, the chamber of the rechargeable energy storage system includes a drain hole.

According to yet another aspect, the air inlet passage of the thermal vent management system is arranged as a Venturi opening adjacent to the nozzle.

According to a further aspect of the present disclosure, a vehicle is provided including a vehicle body including a vehicle floor and a rear bumper. A rechargeable energy storage system is mounted to the vehicle body and includes a housing. A plurality of battery cells are disposed in the housing. A discharge vent passage in communication with the housing, the discharge vent passage including a one-way valve and a nozzle. A chamber in communication with the nozzle and including an air inlet passage with a one-way valve. An outlet pipe connected to the chamber.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
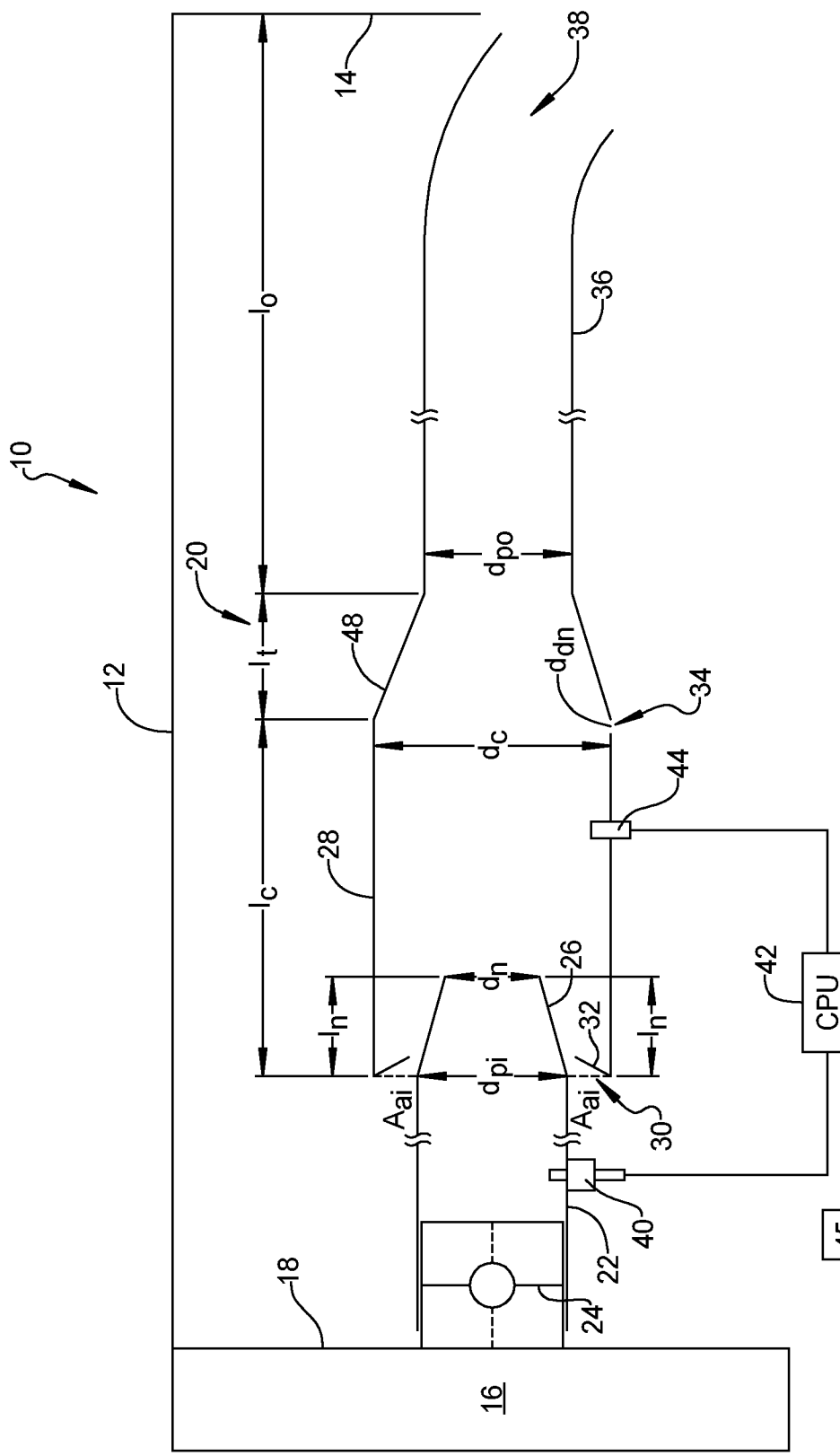
FIG. 1 is a schematic view of a vehicle having a rechargeable energy storage system having a thermal vent management system according to the principles of the present disclosure.

With reference to FIG. 1, a portion of a vehicle 10 is schematically shown including a vehicle floor 12 and a rear bumper 14 of the vehicle 10. A rechargeable energy storage system 16 includes a housing 18 which can be mounted below the vehicle floor 12. As is known in the art, the rechargeable energy storage system 16 includes a plurality of battery cells that are stored inside of the housing 18.

A thermal vent management system 20 is provided for venting and cooling any hot gasses expelled from any of the battery cells within the housing 18. The thermal vent system 20 includes a discharge vent passage 22 in communication with the housing 18 and including a spring loaded collapsible one-way valve 24 and a nozzle 26. A chamber 28 is in communication with the nozzle 26 and includes an air inlet passage 30 with one or more one-way valves 32. The air inlet passage 30 is arranged as a Venturi opening adjacent to the nozzle 26. The chamber 28 includes a drain hole 34 and an outlet pipe 36 connected to the chamber 28. The outlet pipe 36 can include an outlet end 38 in a region below the rear bumper 14. A temperature or gas sensor 40 can be provided in the discharge vent passage 22 and connected to a controller 42 that can communicate to the operator or other system components when a discharge event of the rechargeable energy storage system occurs based upon the temperature sensor 40 detecting a temperature increase within the discharge vent passage 22. Accordingly, when the controller 42 detects a sudden increase in the temperature as detected by the temperature sensor 40, the controller can activate an alarm 45 (such as an indicator light or other audio or visual indicator) to notify the user of the discharge event.

The controller 42 can be or includes any of a digital processor (DSP), microprocessor, microcontroller, or other programmable device which are programmed with software implementing the above described logic. It should be understood that alternatively it is or includes other logic devices, such as a Field Programmable Gate Array (FPGA), a complex programmable logic device (CPLD), or application specific integrated circuit (ASIC). When it is stated that controller 42 performs a function or is configured to perform a function, it should be understood that controller 42 is configured to do so with appropriate logic (such as in software, logic devices, or a combination thereof). When it is stated that controller 42 has logic for a function, it should be understood that such logic can include hardware, software, or a combination thereof.

Figure 2:
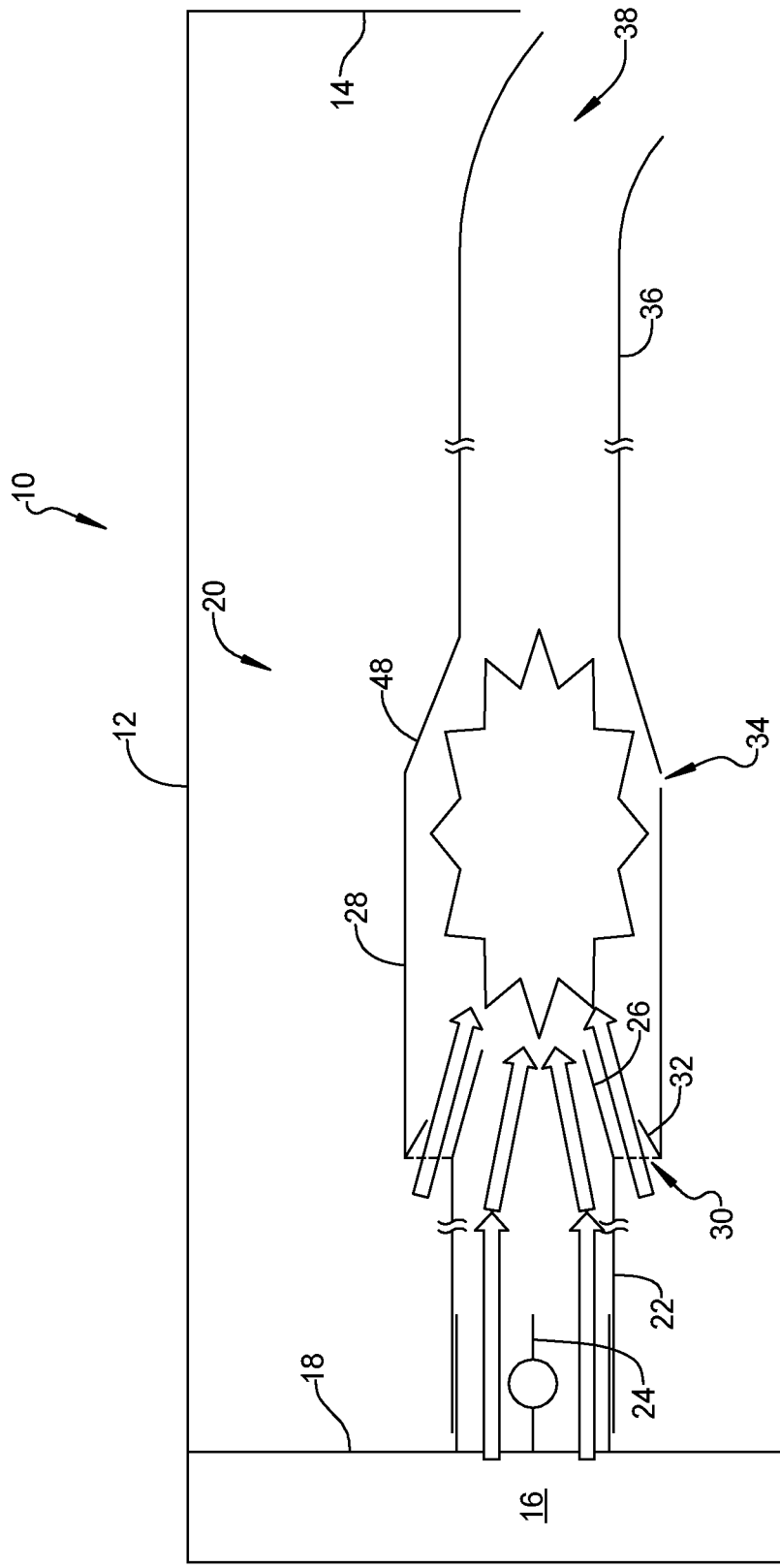
FIG. 2 is a schematic view of the vehicle having a rechargeable energy storage system and showing the venting of gasses to the thermal vent management system according to the principles of the present disclosure.
Figure 3:
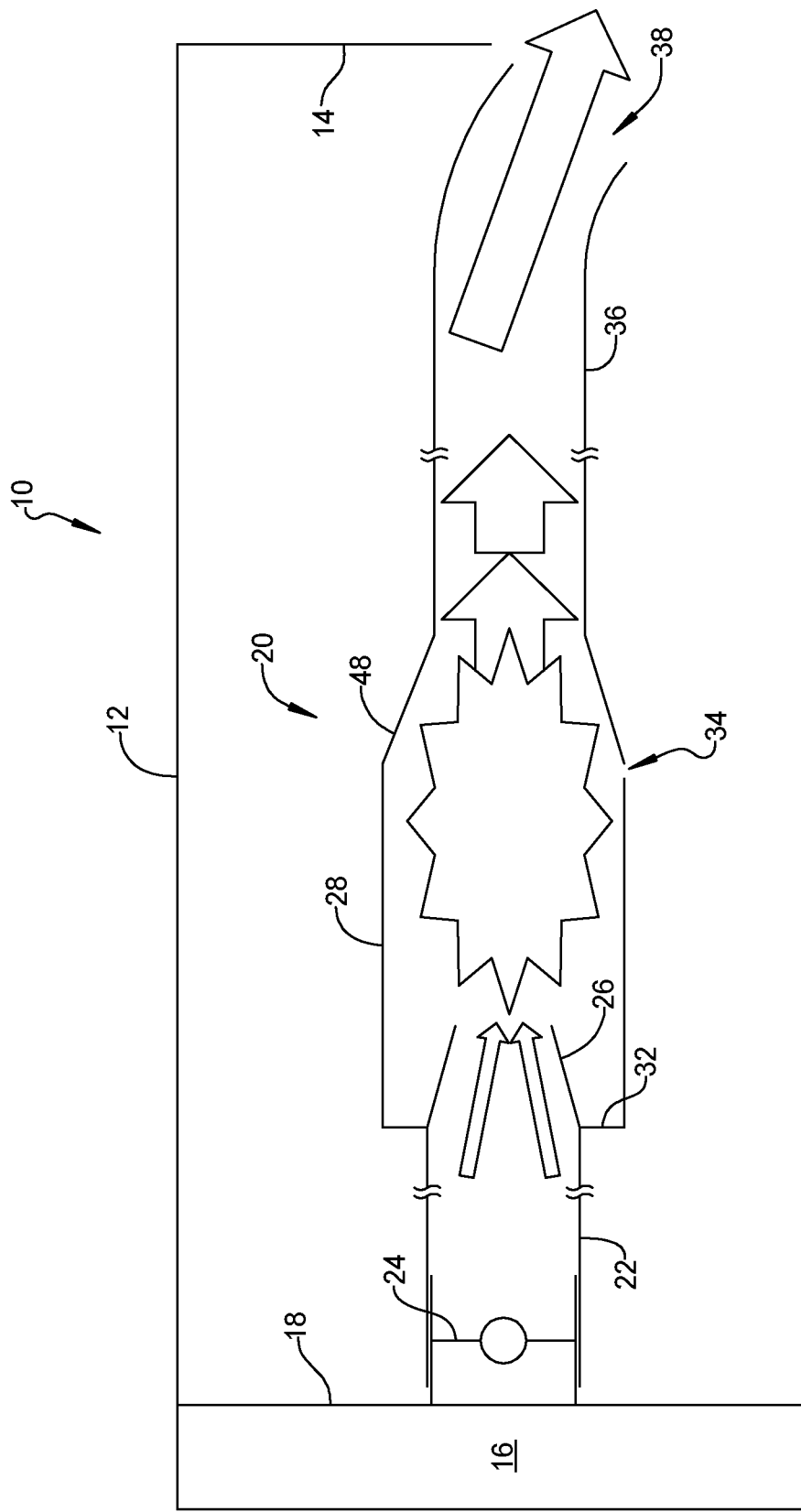
FIG. 3 is a schematic view of the vehicle having a rechargeable energy storage system and showing the possible combustion of the vented gasses within the thermal vent management system according to the principles of the present disclosure.

In operation, the thermal vent management system 20 mixes the discharged gasses/products from the rechargeable energy storage system 16 with air, cooling the discharged gasses/products and directing them out through the outlet pipe 36. As shown in FIG. 2, the mixing (M) is caused by the outflow of the discharge gasses through the one way valve 24 into the chamber 28 and the generation of a Venturi suction force for drawing in ambient air through the one-way valve 32 in the air inlet passage 30. Thus the system is passive with no powered components. As shown in FIG. 3, the thermal vent management system 20 can also allow for auto-ignited combustion (C) of the gasses within the chamber 28 and outside of the housing 18 of the rechargeable energy storage system 16 depending on the tuning of the design and conditions of the venting event. Alternatively or additionally, the chamber 28 can be provided with an igniter 44 (as shown in FIG. 1) which can be activated by the controller 42 in response to the detection of a thermal event as detected by the temperature sensor 40. Accordingly, the igniter 44 can be activated to cause combustion of any combustible gasses and products discharged from the rechargeable energy storage system 16 within the chamber 28. By-products of the cooled or combusted gasses are discharged from the chamber 28 through the outlet pipe 36 and through the condensate drain hole 34.

The thermal vent management system 20 uses the energy of gasses discharging from a rechargeable energy supply system to force the gas through the one-way valve 24 and the nozzle 26. The thermal vent management system 20 uses the Venturi effect driven by the hot exhaust gasses from the nozzle to mix the gasses with ambient air within the chamber 28 to reduce the temperature of the gasses. The use of one-way valves 24, 32 contain the gasses within the chamber 28 while allowing gasses to flow out of the rechargeable energy supply system 16. The one-way valve 32 allows ambient air to flow into the chamber 28 in proper proportions to achieve the desired cooling and combustion effects.

With reference to FIG. 1, the discharge vent passage 22 can be circular, oval, square, rectangular, or other shaped in cross section and can include a diameter/geometric dimension $d_{pi}$. The nozzle 26 has a tapering wall surface in a downstream direction and including a diameter $d_n$ at its downstream outlet end. The nozzle 26 has a length $l_n$ and can extend into the enlarged chamber 28 by an insertion distance $i_n$. The chamber 28 can be circular, oval, square, rectangular, or other shaped in cross section and can have a diameter/geometric dimension $d_c$ that is larger than the discharge vent passage 22. The chamber 28 has a length $l_c$ and the condensate drain hole 34 can have a diameter/geometric dimension $d_{dh}$. The outlet pipe 36 is connected to the chamber 28 by a tapering section 48 that can be gradually reduced in diameter from the chamber 28 to the outlet pipe 36. The tapering section 48 can have a length $l_t$. The outlet pipe 36 can include a diameter/geometric dimension $d_{po}$ and a length $l_o$. The length $l_c$ and diameter $d_c$ of the chamber 28 can be designed to allow expansion, combustion and mixing of the released gasses with air and contain the gasses while combustion, mixing and cooling occur. The remaining dimensions are designed to be selected dependent upon the particular application and operating conditions.

The thermal vent management system 20 can be located to direct the cooled and/or combusted gasses from the chamber 28 to a desired location of the vehicle, away from occupants, first responders and vehicle components.

It is anticipated that the thermal vent management system 20 can be implemented without provisions for ambient air to mix with the rechargeable energy supply system gasses and only directs the gasses to a designed location on the vehicle, away from occupants and vehicle components. In this instance, the air inlet passage 30, valves 32 and the nozzle 26 can be eliminated.

Figure 4:
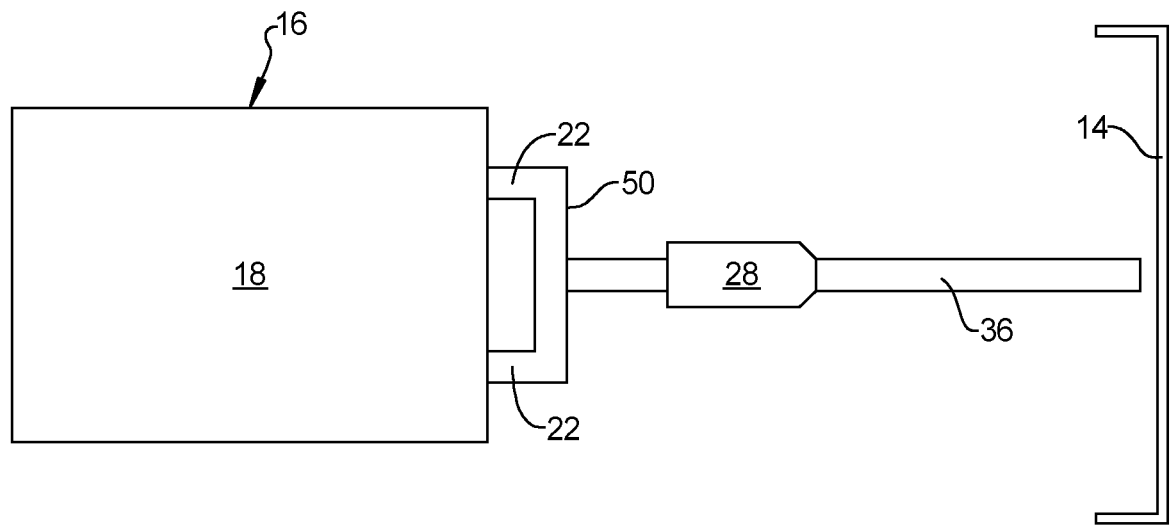
FIG. 4 is a schematic view of a rechargeable energy storage system having dual vent passages to the thermal vent management system.
Figure 5:
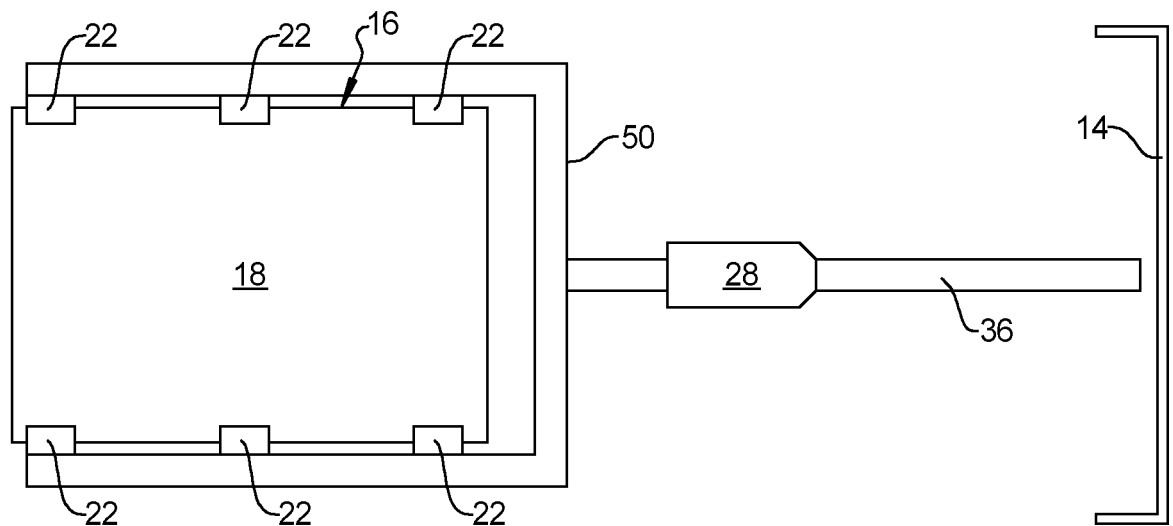
FIG. 5 is a schematic view of a rechargeable energy storage system having multiple vent passages to the thermal vent management system.

The chamber 28 can be provided with baffles and/or heat exchange fins for controlling or cooling the discharged gasses. With reference to FIG. 4, the thermal vent management system can include dual discharge vent passages 22 connected to a vent manifold 50, or as shown in FIG. 5 the thermal vent management system can include multiple discharge vent passages 22 disposed around the housing 18 and that communicate with the chamber 28 via a vent manifold 50 in the manner as described above.

Figure 6:
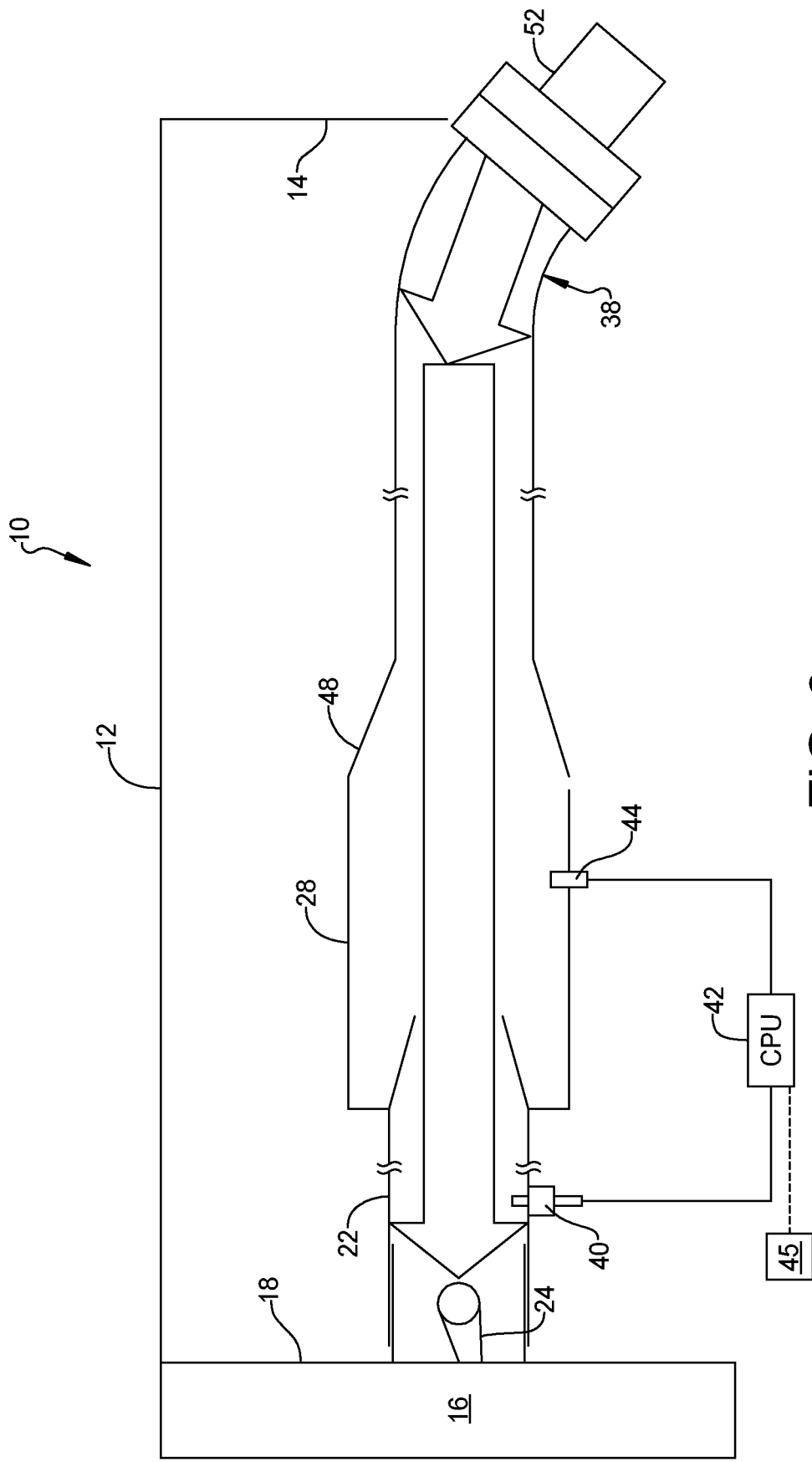
FIG. 6 is a schematic view of thermal vent management system utilized to flood the rechargeable energy storage system with fire suppressant.

As shown in FIG. 6, the discharge pipe 36 of the thermal vent management system 20 can also serve as a means to introduce fire suppressant into the housing 18 of the rechargeable energy storage system 16. As shown in FIG. 6, a fire hose 52 or other fire suppressant hose can be engaged with the outlet end 38 of the discharge pipe 36 and water or other fire suppressant can be delivered through the thermal vent management system 20 into the housing 18 of the rechargeable energy storage system 16. The pressure of the water or other suppressant can cause the spring loaded collapsible one-way valve 24 to break away, as shown, to allow access to the housing 18.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

What is claimed is:

1. A rechargeable energy storage system, comprising:
a housing;
a plurality of battery cells disposed in the housing;
a discharge vent passage in communication with the housing, the discharge vent passage including a first one-way valve and a nozzle downstream from the first one-way valve and the nozzle including a wall surface that tapers inwardly to get narrower in a downstream direction;
a chamber in downstream communication with the nozzle and including at least one air inlet passage with a second one-way valve, the at least one air inlet passage being arranged as a Venturi opening adjacent to and parallel with the nozzle for drawing ambient air through the second one-way valve and into the chamber when gasses are discharged through the nozzle from the housing; and
an outlet pipe connected downstream to the chamber.

2. The rechargeable energy storage system according to claim 1, wherein the chamber includes a drain hole.

3. The rechargeable energy storage system according to claim 1, wherein the chamber has a larger cross section in a direction perpendicular to a flow direction than a cross section of the discharge vent passage in the direction perpendicular to the flow direction.

4. The rechargeable energy storage system according to claim 3, wherein the cross section of the chamber in the direction perpendicular to the flow direction is larger than a cross section of the outlet pipe in the direction perpendicular to the flow direction.

5. The rechargeable energy storage system according to claim 1, further comprising one of a gas or temperature sensor in the discharge vent passage.

6. The rechargeable energy storage system according to claim 5, wherein the one of a gas or temperature sensor provides signals to a controller and wherein the controller provides signals for activating an ignitor in the chamber.

7. A vehicle, comprising:
- a vehicle body including a vehicle floor and a rear bumper;
- a rechargeable energy storage system including:
  - a housing;
  - a plurality of battery cells disposed in the housing;
  - a discharge vent passage in communication with the housing, the discharge vent passage including a first one-way valve and a nozzle downstream from the first one-way valve and the nozzle including a wall surface that tapers inwardly to get narrower in a downstream direction;
  - a chamber disposed below the vehicle floor and in downstream communication with the nozzle and including an air inlet passage with a second one-way valve the at least one air inlet passage being arranged as a Venturi opening adjacent to and parallel with the nozzle for drawing ambient air through the second one-way valve and into the chamber when gasses are discharged through the nozzle from the housing; and
  - an outlet pipe connected downstream to the chamber and opening at a location below the rear bumper.

8. The vehicle according to claim 7, wherein the chamber includes a drain hole.

9. The vehicle according to claim 7, wherein the chamber has a larger cross section in a direction perpendicular to a flow direction than a cross section of the discharge vent passage in the direction perpendicular to the flow direction.

10. The vehicle according to claim 9, wherein the cross section of the chamber in a direction perpendicular to the flow direction is larger than a cross section of the outlet pipe in the direction perpendicular to the flow direction.

* * * * *